J. A. TURNER.
LIQUID LEVEL INDICATOR.
APPLICATION FILED AUG. 21, 1912.
1,093,745.
Patented Apr. 21, 1914.
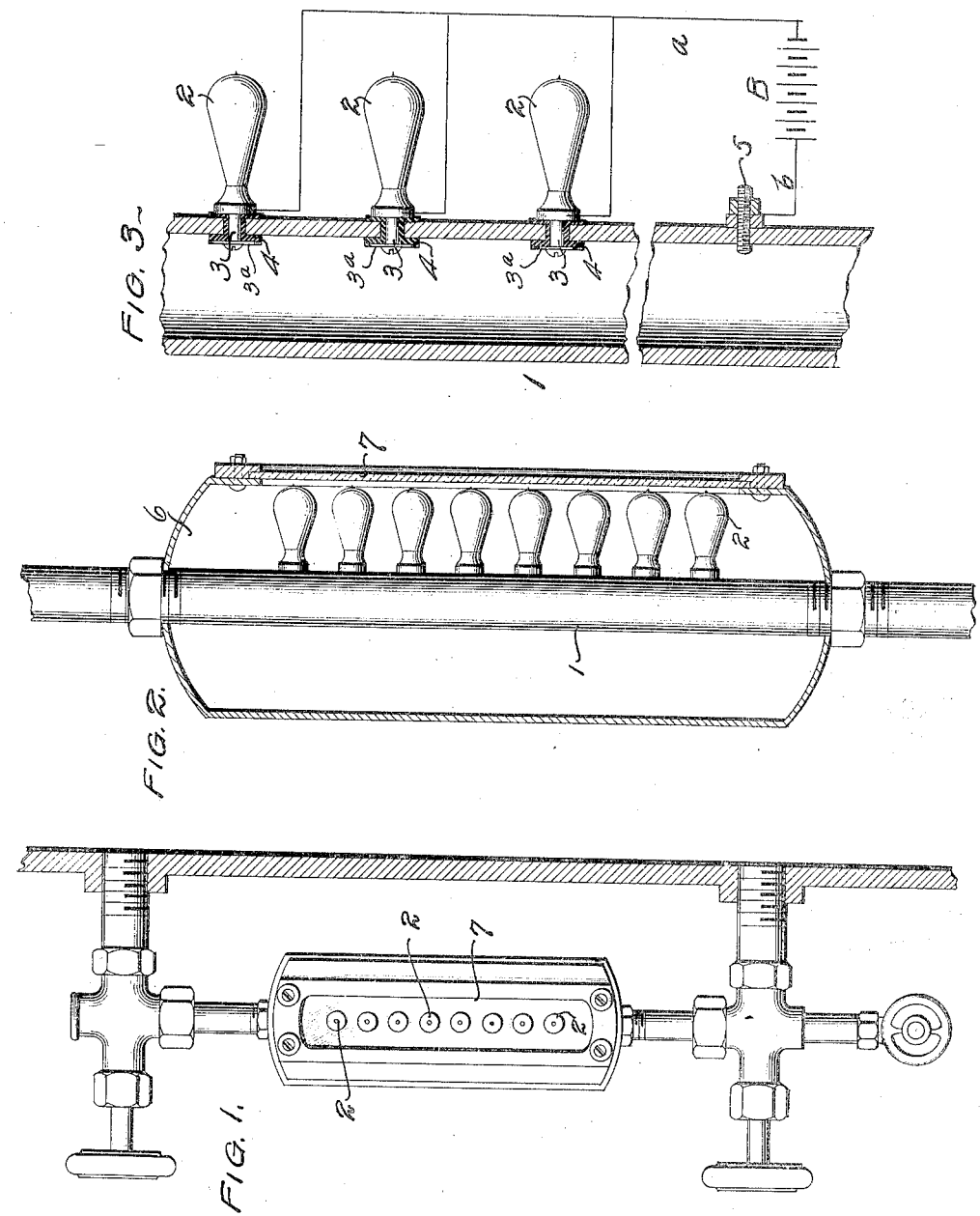
WITNESSES
INVENTOR
JOHN A. TURNER.
By
His Attorney

UNITED STATES PATENT OFFICE.

JOHN A. TURNER, OF WASHINGTON, DISTRICT OF COLUMBIA.

LIQUID-LEVEL INDICATOR.

1,093,745. Specification of Letters Patent. Patented Apr. 21, 1914.

Application filed August 21, 1912. Serial No. 716,313.

*To all whom it may concern:*

Be it known that I, JOHN A. TURNER, a citizen of the United States, residing at Washington, in the District of Columbia, have invented certain new and useful Improvements in Liquid-Level Indicators, of which the following is a specification.

This invention relates to signaling devices of the type that are employed for indicating the level of liquid in tanks, reservoirs, and other liquid containers.

To this end the invention has for its object, the provision of a simple and practical liquid level indicator which is entirely automatic in its operation and capable of general application to or with liquid containers of any character, and providing means for giving a visual indication of the exact level of the liquid therein. Also, a further object of the invention is to provide a liquid level indicator that may be constructed and installed in an economical manner by reason of largely utilizing standard appliances and devices.

A more general object of the invention is to provide a signaling or indicating device for visually indicating the level of liquid in a container by electrical means including a circuit or circuits opened and closed by the liquid as it rises and falls, the electrical circuit being established through and by the liquid.

With these and other objects in view which will more readily appear as the nature of the invention is better understood, the same consists in the novel construction, combination, and arrangement of parts hereinafter more fully described, illustrated and claimed.

The essential features of the invention, both from a structural standpoint and that of application, are necessarily susceptible of modification without departing from the spirit or scope of the invention, but one of the preferred and practical embodiments and uses of the invention is shown in the accompanying drawings, in which—

Figure 1 is a sectional elevation showing the application of the invention as a water gage for boilers. Fig. 2 is an enlarged sectional view of the indicator, showing a preferable arrangement of the series of visual indicating elements within a protective casing. Fig. 3 is a detail sectional view showing the structural mounting of the indicating elements and the circuit therefor, in connection with a water column where electric lamps are employed as the indicating element.

Like references designate corresponding parts in the several figures of the drawings.

In carrying out the invention, the same, as stated, is susceptible of general application to tanks, reservoirs, or other liquid containers, and may obviously be employed either in proximity to, or remote from, the container, inasmuch as communication is provided between the indicator and the container holding the liquid through the medium of what may be termed the gage tube or pipe in which the water rises and falls according to the level of the liquid. Accordingly, the invention includes in its organization the said gage tube or pipe designated by the numeral 1 to which is fitted or connected a series of visual indicating elements 2. These elements may be any approved or standard electrical devices, such as annunciators or lamps for giving a visual indication, but for the purpose of illustration the said elements are shown in the drawings as consisting of the ordinary electrical incandescent lamps. Any number of these indicating elements may be employed according to the various levels of the liquids which require observation, and the said elements are spaced apart at any predetermined distance as will be readily understood.

As suggested in the drawings, each of the visual indicating elements or lamps 2 is fitted to the gage tube 1 upon the exterior thereof and may be satisfactorily held in place by means of a metallic fastening screw or equivalent element 3 which constitutes one of the line terminals of the lamp. This metallic fastener 3 is insulated from the wall of the tube or pipe 1 by means of an insulating bushing 4 fitting in the hole that receives the fastener 3, and having insulating flanges upon both the inner and outer sides of the tube wall. The inner ends of the said fasteners 3 are exposed within the gage tube so that as the water rises in the latter it will contact with one or more of the fasteners or terminals according to the level of the liquid. The other terminal of each lamp or indicating element 2 is connected by the circuit wire *a* with one terminal of the electrical battery B or other source of electrical energy, the other terminal of the latter having a wire connection *b* with a common terminal contact 5 fitted to the metallic wall of the gage tube. Accordingly, upon the rise of the column of water in the tube 1 to the level of any one of the indicating elements 2, a circuit will be closed by and through the water with the result of energizing the said indicating elements and showing visually the level of the water. The action is the same for the entire series of lamps or indicating elements.

In the application of the invention shown in the drawings, the gage tube 1 and its series of indicating elements 2 are preferably housed within a protective casing 6 and which casing is provided at one side with a detachable window 7 through which the indications of the said elements 2 may be readily observed. The contact terminal surfaces for the water may be made of increased area by metal washers 3ª, or equivalent means, to insure sufficient contact under all conditions of the water for establishing the electrical circuit.

I claim:

1. A liquid level indicator comprising a metal conducting tube adapted to hold a rising and falling column of the liquid, a series of separate electrical visual indicator elements arranged in spaced relation and each of which elements is provided with a single metal terminal exposed to the interior of the said tube but insulated from the wall thereof, and an electrical working circuit including the single metal terminals of all of the said indicator elements and having a common metallic return circuit connection with the metal wall of the tube whereby the liquid as it rises and falls in the tube respectively closes and opens the circuit between said wall and the nearest single metal terminal.

2. A liquid level indicator comprising a single metal tube adapted to contain a rising and falling column of water, a series of electrical lamps arranged in spaced relation at different elevations, each of said lamps having a single supporting metal terminal exposed to the interior of the metal tube but insulated from the wall thereof, and an electrical working circuit including the said single metal terminals of all of the lamps and also having a common metallic return circuit connection with the metal wall of the tube whereby the liquid as it rises and falls in the tube respectively closes and opens the circuit of each lamp between the single terminal of the latter and the metal wall of the tube.

In testimony whereof I hereunto affix my signature in the presence of two witnesses.

JOHN A. TURNER.

Witnesses:
E. H. McLachlen,
Emory L. Groff.